United States Patent [19]

Cheng

[11] 4,072,182
[45] Feb. 7, 1978

[54] PRESSURE STAGED HEAT EXCHANGER

[75] Inventor: Dah Yu Cheng, Palo Alto, Calif.

[73] Assignee: International Power Technology, Inc., Palo Alto, Calif.

[21] Appl. No.: 756,891

[22] Filed: Jan. 5, 1977

[51] Int. Cl.² ............................................. F22B 1/00
[52] U.S. Cl. ............................ 165/1; 122/DIG. 4; 122/406 S; 60/645; 60/670
[58] Field of Search ............ 165/1; 122/406 S, 235 Q, 122/448 S, DIG. 4; 60/670, 645

[56] References Cited

U.S. PATENT DOCUMENTS

| | | | |
|---|---|---|---|
| 2,032,368 | 3/1936 | Kerr | 122/235 Q |
| 3,162,179 | 12/1964 | Strohmeyer, Jr. | 122/406 S |

*Primary Examiner*—Albert W. Davis, Jr.

[57] ABSTRACT

An improved system of transferring heat energy from a high temperature fluid to a low temperature fluid is described. A countercurrent heat exchanger is employed in which heat transfer fluids undergo one or more thermodynamic transitions at various pressures by employing conventional heat exchangers having additional components. It has been determined that by employing this system of the present invention under a critical choice of design parameters, a substantially greater amount of heat energy can be transferred per unit area of the heat exchanger than was possible by conventional techniques.

16 Claims, 15 Drawing Figures

FIG__5.

FIG__6.

FIG__7.

FIG_8.

FIG_9.

FIG__10.

FIG__11.

FIG_12.

FIG_13.

FIG__14.

FIG__15.

PRESSURE STAGED HEAT EXCHANGER

BACKGROUND OF THE INVENTION

Heat exchangers are employed in various chemical engineering processes such as power plants, oil refineries, chemical reactors and energy retrieval systems. Generally, heat exchanger design has focused upon means to transfer the greatest amount of heat per unit surface area of the exchanger. The transfer of heat is governed by the equation $$Q = AU\Delta T_m$$

$Q$ = the heat transfer rate
$A$ = the heat exchanger surface area
$U$ = the overall heat transfer coefficient
$\Delta T_m$ = the log-means-temperature of the heat exchanger Thus, the heat transfer rate is directly proportional to the surface area of the heat exchanger and the log-mean-temperature difference of the fluids in the exchanger.

In its simplest form, a first fluid enters the exchanger at a high temperature while a second fluid enters at a lower temperature. Heat is exchanged between the two fluids, either traveling in cocurrent or countercurrent paths. Unless thermodynamic transition occurs in one or more of the fluids, the high temperature fluid continues to cool while the lower temperature fluid continues to heat throughout the path of the exchanger. When thermodynamic transition occurs, for example, within the fluid to be heated, that fluid does not change temperature during the heat transfer process. Such a phenomenom occurs when an ice-water mixture is at equilibrium in which heating of the mixture does not raise its temperature above 0° C. until all of the ice is melted. Similarly, water will boil at 100° C. at one atmosphere pressure without a temperature rise until the liquid water has dissipated. Refining high grade gasoline from crude oil utilizes the phenomenon of thermodynamic transition for fractional distillation.

The use of a fluid which undergoes thermodynamic transition in a heat exchanger environment can be most useful. As can be seen from the equation recited above, the heat transfer rate is proportional to the log-mean temperature difference of the fluids within the exchanger. Thus, when one fluid undergoes thermodynamic transition, energy is transferred to that fluid without a temperature increase so that the log-mean temperature difference of the two fluids can be increased with respect to heat exchangers wherein no thermodynamic transition occurs. Looked at differently, a most economical heat exchanger is one where the temperature difference between the two fluids is kept at a maximum to minimize the surface area for a given heat transfer rate. When the temperatures of the two fluids begin to approach one another, the heat exchanger requires a maximum surface area and, thus, heat transfer per unit area is at an extremely low point. If one approaches the theoretical limit wherein the fluids are at the same temperature, energy transfer would cease and the heat exchanger would no longer have practical utility.

Prior art heat exchangers traditionally supply a fluid to be heated under certain pressure. The temperature of the fluid begins to rise generally under a continuously smooth temperature profile unless thermodynamic transition occurs. If such a transition does in fact occur, the heated fluid would for a period have a constant or flat temperature profile until, for example, all of the liquid has been converted into vapor at which point the vapor would exit the heat exchanger at its boiling point or, if the heat exchanger were extended to a further length, the heated fluid would exit as superheated vapor and be collected. As stated previously, the limiting variable is the temperature difference between the heating and heated fluids for when this temperature difference is small, very little heat energy is transferred between said fluids. If the temperature difference between the two fluids is small, a heat exchanger must have a correspondingly large surface area in order to transfer a given amount of heat. An optimum situation would exist if one could maintain the temperature difference between the fluids at a maximum so that the heat exchanger surface area could be kept at a minimum and thus reduce the equipment costs involved in the energy transfer.

SUMMARY OF THE INVENTION

In accordance with the present invention, a pressure staged heat exchanger is provided in which at least two evaporators are separated by staged pumps. As the fluid to be heated enters the heat exchanger, it increases in temperature until it reaches its thermodynamic transition point at a pressure below the final desired exit pressure of said fluid. During the first thermodynamic transition, the fluid has only partially changed its thermodynamic phases. The two-phase fluid is then pressurized to a final designed pressure. At this point, the thermodynamic transition temperature has changed and the heated fluid begins to undergo a second thermodynamic transition. This takes place while the fluid enters into thermodynamic transition in a second higher temperature section and continues thermodynamic transition until the fluid, for example, in a liquid state is vaporized. Once vaporized, the temperature of the vapor begins to increase and, in the case of water, superheated steam exits the heat exchanger.

The pressure staged heat exchanger described in the previous paragraph in the case of liquid to vapor transition was described as having two evaporators separated by a single stage pump. As will be explained later, however, a pressure staged heat exchanger can be designed with a multitude of evaporators separated by a multitude of stage pumps. The number of such stages depends upon design characteristics such as additional energy costs in operating multiple pumps, the surface area reduction of the exchanger, the nature of the fluids employed in the energy transfer and the payoff in weight, cost and energy recovery efficiency.

DESCRIPTION OF THE PREFERRED EMBODIMENT

Figure 1:
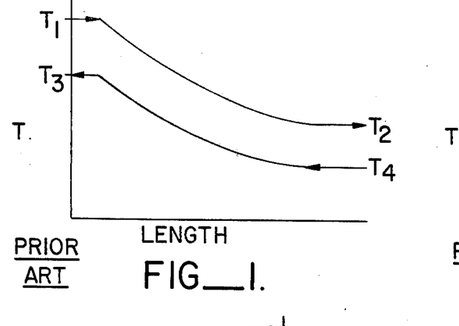
FIG. 1 is a graph of the typical temperature profile of a countercurrent heat exchanger without thermodynamic transition.
Figure 2:
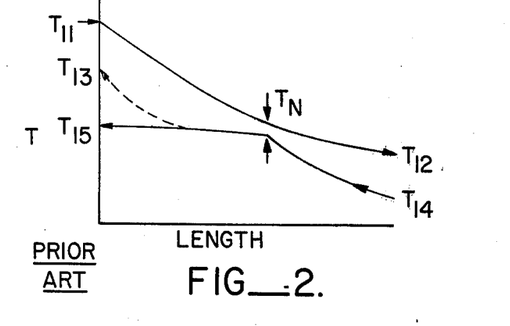
FIG. 2 is a graph showing the typical temperature profile of a countercurrent heat exchanger with thermodynamic transition.

FIGS. 1 and 2 represent prior art heat exchangers in which the heated and heating fluids travel in countercurrent paths. Without thermodynamic transition, hotter fluid entering the heat exchanger at temperature $T_1$ cools to a point $T_2$ at the exit of the heat exchanger while heated liquid enters at the other end of the exchanger at temperature $T_4$ and follows a countercurrent path to exit at temperature $T_3$. If thermodynamic transition does in fact occur, the fluid to be heated enters the heat exchanger at temperature $T_{14}$ and progresses to $T_{15}$ at which temperature spontaneous thermodynamic transition occurs. If the heated fluid is a liquid, which has been converted into a vapor, exits the heat exchanger during or after thermodynamic transition without further heating, said liquid would thus exit at temperature $T_{15}$ for during thermodynamic transition, the temperature is constant. If, however, the heated material remains in the heat exchanger after thermodynamic transition has occurred, for example, after all of the liquid has been converted into a vapor state, then the vapor becomes superheated in the following section of the exchanger and exits at temperature $T_{13}$.

As stated previously, a limiting factor in prior art heat exchangers is the temperature difference between the heating and heated fluids. As this temperature difference becomes smaller, a greater surface area is needed to transfer a specific quantity of heat energy per unit time. Thus, for a heat exchanger of a given surface area, the amount of heat that can be transferred is directly affected by the temperature difference $T_N$ which is called the temperature "neck". Referring again to FIG. 2, one would like a maximum amount of the heated fluid to reach $T_{15}$ or $T_{13}$. However, the limiting factor is $T_N$. As $T_N$ grows smaller, the heat transfer per unit area becomes less, thus limiting the amount of heated fluid to reach $T_{15}$ or $T_{13}$. Theoretically, $T_N$ cannot be 0 or negative for this would violate the second law of thermodynamics. But it can be seen that prior art heat exchangers possessing fluids which undergo thermodynamic transition are limited by the $T_N$ temperature and thus are limited to the final $T_{12}$ exit temperature of the heating fluid. The lower $T_{12}$, the more heat is exchanged between the two fluids.

The physics of the present invention resides in the realization that the thermodynamic transition temperatures of a fluid can be controlled by controlling the pressure to which the fluid is exposed. To pressurize a fluid in the liquid form requires relatively little pump work, but a much larger amount of pump work is required to compress a vapor. While practicing the present invention thus requires more pump work than prior art techniques in which only a fluid in a liquid state is compressed, the present invention, in which the thermodynamic transition temperature is controlled, allows more heat recovery per unit area or size of the exchanger resulting in size, cost and weight savings. The trade off between increased pump work and the abovecited savings, controlled by selection of the various thermodynamic phase transitions, is possible only by practicing the present invention. In prior art heat exchangers, the fluid to be heated is generally pressurized at its inlet as a liquid to save pump work and that pressure is maintained approximately constant throughout the heat exchanger. Thus, the heated fluid will have a fixed and invariable thermodynamic transition temperature which, as stated previously, limits the amount of energy which can be transferred for a heat exchanger of specific surface area. Although a fraction of the vapor can be bled off at different pressures for specific applications, the bled off portion of the vapor will not reach the designed high pressure and temperature. In the prior art, compression of the heated fluids is always in the liquid phase, even in advanced systems.

Figure 3:
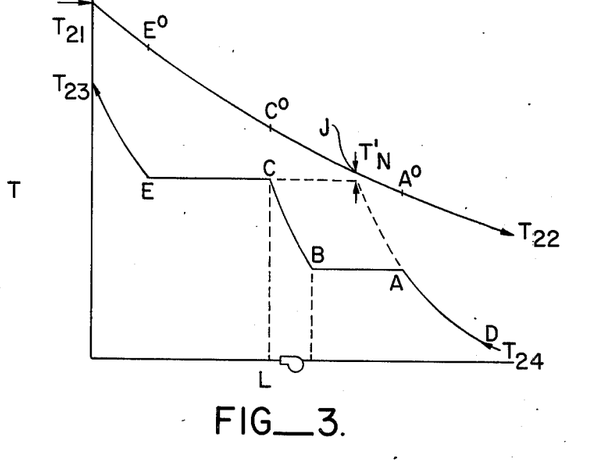
FIG. 3 is a graph of the temperature profile of a countercurrent heat exchanger according to the present invention.
Figure 4:
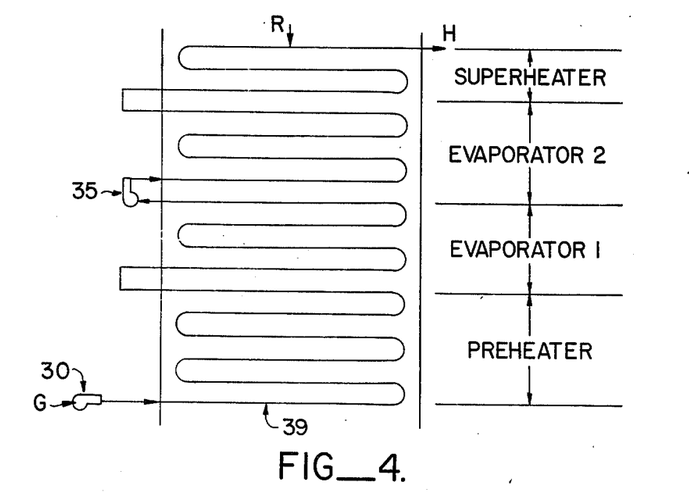
FIG. 4 is a schematic diagram of the device used to generate the temperature profile of FIG. 3.

The present invention can be more adequately appreciated by considering FIGS. 3 and 4. The fluid to be heated enters the heat exchanger at temperature $T_{24}$ and is heated in a section called a preheater shown in FIG. 4. At this point, the fluid is at a pressure lower than the final exit pressure and thus has a lower thermodynamic transition temperature. As the liquid raises in temperature to point A, thermodynamic transition occurs and continues to a predetermined point B. At point B, the fluid is in a liquid/gaseous state, the percentage of each phase being a design variable which will be discussed later. At point B, a staged pump raises the pressure of the heated fluid to the final exit pressure desired. Because of the increased pressure, the two-phase fluid changes its liquid content and enters thermodynamic transition at C. Thermodynamic transition continues until the heated fluid is all vapor, at E. At point E, all of the fluid has been converted to a vapor state and the temperature again begins to rise as superheated vapor is produced. The heated fluid exits the heat exchanger at temperature $T_{23}$ and at a final high exit pressure.

The dotted line A-C in FIG. 3 represents the temperature profile for the heated fluid which undergoes thermodynamic transition carried out in a heat exchanger of the prior art, i.e., without multiple evaporators and a staged pump. In order to appreciate the advantages of the present invention, one need only compare the differences between necks A/AO, C/CO and $T'_N$. By employing the present invention, the necks are orders of magnitude larger than the single neck of the prior art and, thus, the heat transfer per unit area achieved is much greater in the present invention as compared to prior art heat exchangers.

The temperature profile of FIG. 3 can be derived by using apparatus schematically shown in FIG. 4. Liquid to be heated G enters initial pump 30 which forces this liquid into pipes 39 in the preheater stage at a lower pressure than the final pressure. Once the liquid exits the preheater, it enters into a first evaporator wherein part of the thermodynamic transition occurs. This partially evaporated two-phase fluid is compressed by a stage pump to the final desired pressure before entering into the second high pressure evaporator. The thermodynamic transition occurs under a different temperature. This continues until the fluid, now a vapor, enters the superheating stage which continues until the fluid exits at point H. Energy is derived from fluid R entering the exchanger at temperature $T_{21}$ which travels countercurrent to the heated fluid and exits at lower temperature $T_{22}$. Although not shown in the drawing, recirculating pumps can be added to recirculate the fluid within each evaporator. Downdrafts can also be formed to flow off chemical precipitates where desired. This concept is commonly practiced in current heat exchangers and is not considered part of the present invention.

Figure 5:
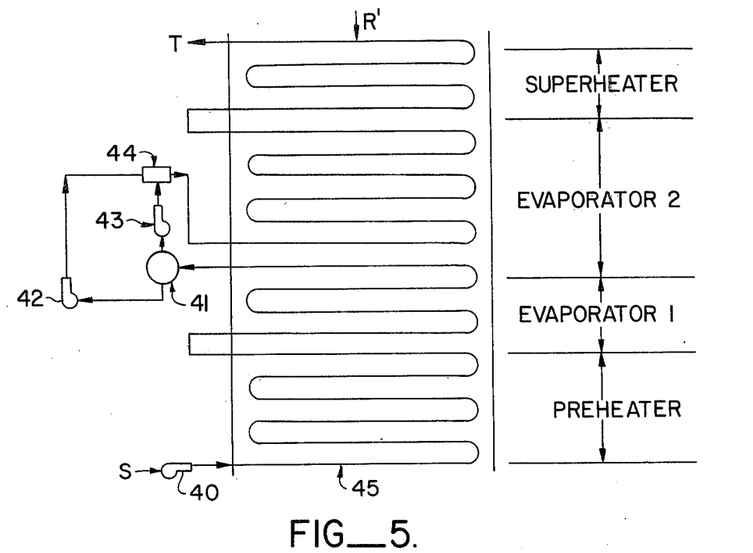
FIG. 5 is a schematic of a countercurrent heat exchanger of the present invention employing liquid-vapor separation, separate liquid/vapor pumps, and remixing, the advantages of which will be explained later.

Among the variables which can be used to determine the overall characteristics of the heat exchanger of the present invention is the fluid quality, hereinafter referred to as $Z_1$, which is the percentage of liquid which has been converted to a vapor in the first fluid evaporator before the staged pump acts to increase the pressure of the heated fluid. When $Z_1$ is between approximately 0 and 10% or within the range of approximately 85 to 100%, a single pump can adequately be used to pressurize the heated fluid. However, when $Z_1$ is in the range of approximately 10 to 85%, it has been found that the liquid-vapor mixture is difficult to compress using a single stage pump. Currently available pumps generally suffer from "cavitation" which is a phenomenon which occurs when the bubbles of vapor within the liquid collapse. It is assumed that pumps available in the future can be developed such that cavitation will be no problem. In any event, if the pressure ratio is not particularly high, a standard positive displacement pump can be used. However, the cavitation problem can also be greatly reduced by using a liquid-vapor separator followed by separate pumps to compress different fractions of the liquid-vapor mixture. Once the separate fractions are compressed, they are remixed before being added to the next evaporator. Such a configuration is shown in FIG. 5 wherein heated fluid S enters primary pump 40 and travels through coils 45. Heated fluid S travels through the preheater section and then, according to the present invention, enters evaporator 1 at which time the fluid enters into a state of thermodynamic transition. Once the fluid has partially vaporized, it enters liquid-vapor separator 41 at which time the liquid is pumped separately through stage pump 42 while the vapor is drawn off and pumped through stage pump 43. Once each component has been compressed to the desired pressure, the fluids are remixed in mixer 44 and passed into the second evaporator wherein a second thermodynamic transition occurs. Upon exit from the second evaporator, the heated fluid is now entirely vaporous and is superheated in the superheat section and exits from the heat exchanger at T.

Figure 6:
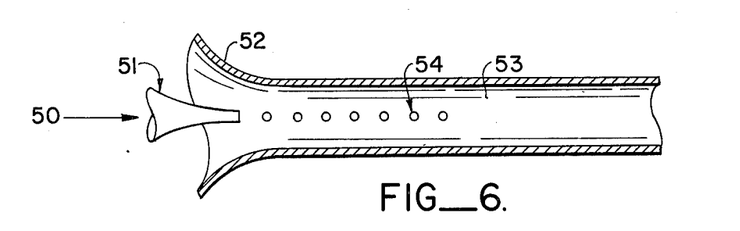
FIGS. 6 and 7 are schematics of typical mixing devices such as used in the apparatus of FIG. 5.
Figure 7:
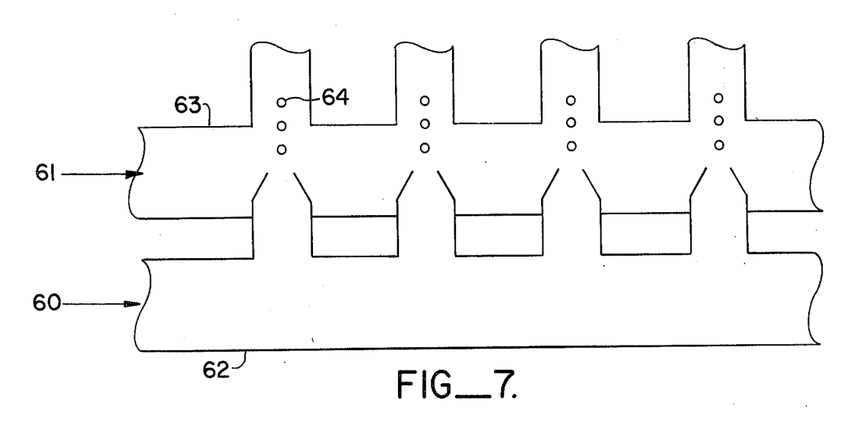

Mixer 44 can be of designs such as shown in FIGS. 6 and 7. In FIG. 6, liquid 53 is mixed with gas 54 through the use of concentric tubing 51, 52. Gas enters the mixer at 50 and is bubbled within liquid 53 and proceeds to the second evaporator. This can also be accomplished through the use of multiple tubing as shown in FIG. 7. In this embodiment, liquid 60 is mixed with gas 61 through piping 62, 63. The gas is bubbled as shown in 64 and continues to pass, together with the liquid phase, into the second evaporator.

Figure 8:
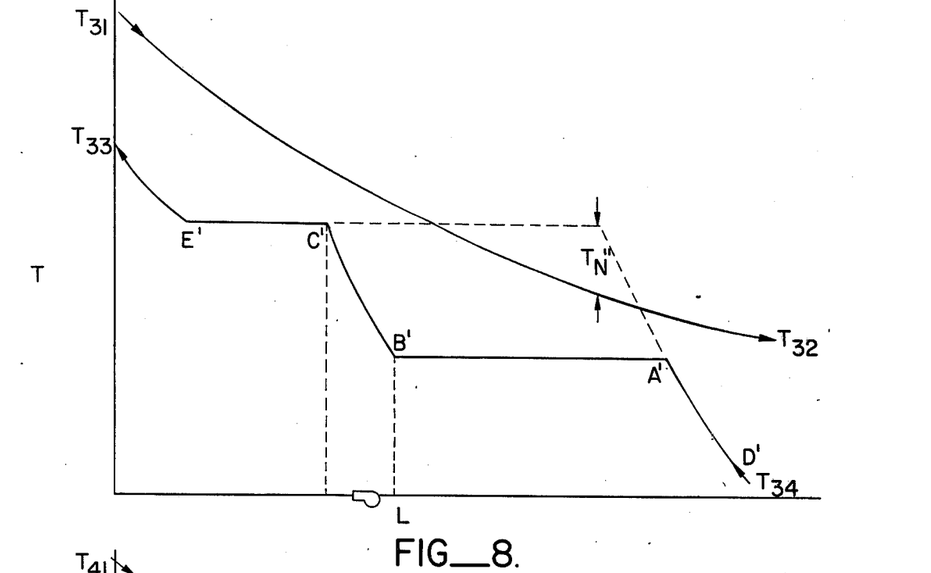
FIG. 8 is a graph of the temperature profile of a "negative pinch" countercurrent heat exchanger according to the present invention.

FIG. 8 shows a graph which further depicts the advantages of the present invention. Naturally, one would seek to maximize the amount of heated fluid to reach the final exit temperature desired. There is a trade off between the maximum $T_{33}$ and the amount of the heated fluid. Once the temperature of the heating fluid $T_{31} - T_{32}$ is set, a temperature profile of the heated fluid cannot rise above the heating fluid temperature and thus the temperature $T_{33}$ or the amount of the heated fluid is limited under conventional heat exchanger designs. The dotted line in FIG. 8 shows that under conventional techniques, if one were to start with a fluid temperature $T_{34}$ and end at a temperature $T_{33}$, at a larger heated fluid flow rate an impossible situation would occur in which the "neck" temperture $T''_N$ would be negative (i.e., the temperature of the heated fluid would be greater than that of the heating fluid). This violates the second law of thermodynamics which prevents heat flowing from a low temperature source to a high temperature sink spontaneously. However, this would not be impossible by the use of the design of the present invention which uses a multi-evaporator system separated by staged pumps, the profile which is shown by solids lines $D' - A' - B' - C' - E'$, indicating the temperature condition under this invention.

The selection of what has been referred to as steam quality $Z_1$, which is the percent of liquid converted into a vapor during thermodynamic transition, greatly effects the overall performance of the heat exchanger. Generally, the larger the steam quality before staging the larger will be the log-mean temperature difference between the heating and heated fluid and the greater will be pump work required. It can be seen that according to the equation $$Q = AU\Delta Tm$$

the log-mean temperature difference of the two fluids is directly proportional to the heat transfer rate between said fluids. There are limiting factors besides the pump work trade off which control the selection of the steam quality. For example, a large $Z_1$ requires higher pumping work of the stage pump and, at times, the savings which result in reduced surface area of the heat exchanger cannot compensate for the increased pump work and operating costs involved. Furthermore, a large log-mean temperature difference can cause an increase in local heat flux in the evaporator section wherein liquid is being converted into vapor. When the heat flux is nominal, the vapor is created in the form of bubbles formed from nucleate boiling which detach from the heat transfer surface and are swept along in the liquid. When the heat flux is further increased, particularly when the stream velocity is low, evaporation causes formation of a vapor film. Vapor films traditionally exhibit poor heat conductivity so that the tube walls can become very hot and can cause a condition known in the boiler art as a "burn-out." Furthermore, a wrong choice of $Z_1$ and pressure ratio can result in either too much pump work or bulb collapsing during remixing causing an inability to avoid the "negative pinch" situation discussed previously.

There are optimum log-mean temperature differences and also "neck" temperature differences at which the surface of the heat exchanger is minimized with respect to the smallest amount of pump work. This depends upon specific properties and conditions of the fluids used as well as the heat exchanger design. Once the thermodynamic properties are known, this optimum can be calculated using standard heat transfer calculation methods, empirically-determined heat transfer coefficients and pump work calculations, on a section-by-section basis within the heat exchanger.

Generally speaking, increased pump work is not a major problem if the heat content of the heated fluid during phase transition is very large and the compression ratio required of the fluid is relatively small. In the case of substances such as methane which have a heat content during transition of approximately one-third that of water, a large $Z_1$ is not very economical. The compression work of the mixture is related to the thermodynamic function called specific heat ratio $$\lambda = C_p/C_v$$

$C_p$ = the specific heat at constant pressure
$C_v$ = specific heat at constant volume The larger the specific heat ratio, the more work is required to compress a vapor. In general, a long chain molecular vapor has a relatively small specific heat ratio while a simple molecular vapor has a large ratio. Therefore, depending on the heat exchanging fluids and the purpose of the exchanger, such as a desired high $T_{33}$ or a larger amount of heated fluid, an optimum $Z_1$ can be found between the first and second evaporators across the stage pump.

Figure 9:
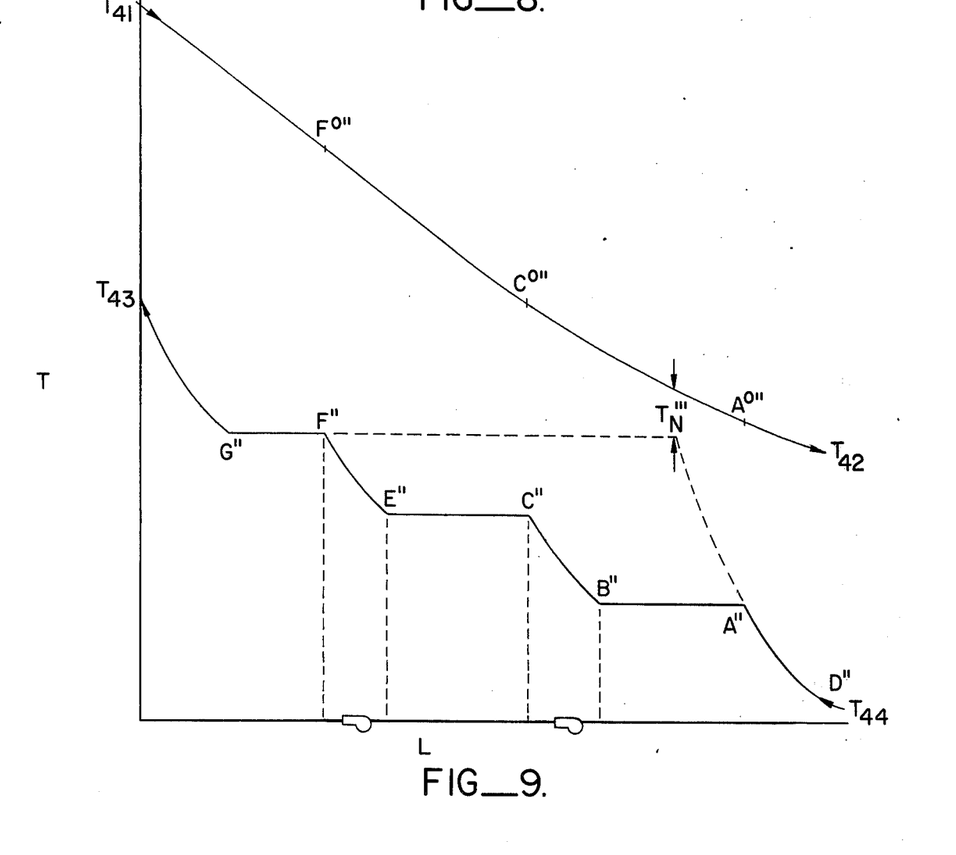
FIG. 9 is again a graph of the temperature profile of a countercurrent heat exchanger according to the present invention in which more than two evaporators are employed.

Another variable is the use of multiple evaporators. For example, FIG. 9 shows a temperature profile employing three evaporators and two stage pumps. Under conventional systems, the heated fluid would follow the temperature profile shown by the dotted line which results in a "neck" or $T_N'''$. However, by employing a triple evaporator system, the heated fluid would preheat in sections D''-A'', enter transition between A''-B'', be compressed at B''-C'', enter second phase transition at C''-E'', be recompressed by a second stage pump at E''-F'', enter a third phase transition at F''-G'' and exit the exchanger at $T_{43}$. A number of temperature "necks" are formed at A''-A$^{o''}$, C''-C$^{o'''}$ and F''-F$^{o''}$. One can see by this figure that the "necks" are greatly increased over $T_N'''$, the "neck" of a conventional system. Thus, the log-mean temperature difference is increased and the heat transfer rate is resultantly improved.

Figure 10:
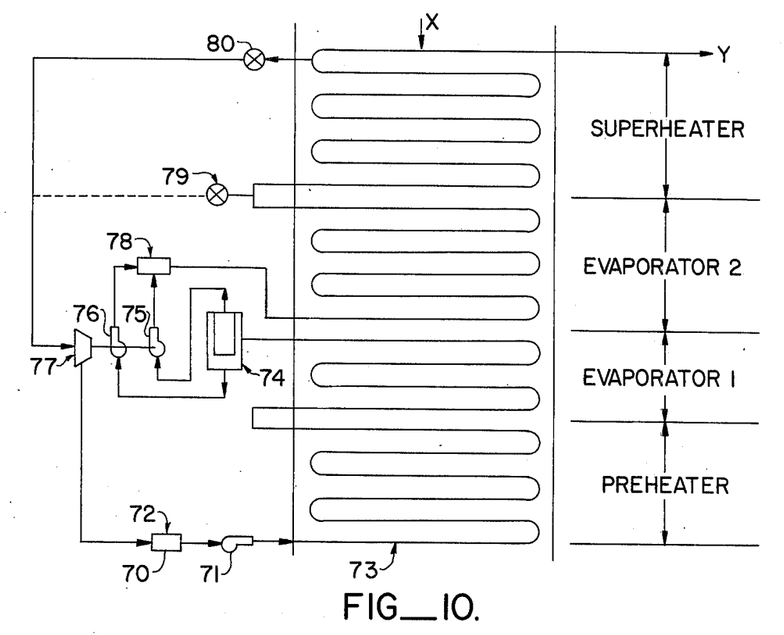
FIG. 10 is a schematic of a countercurrent heat exchanger according to the present invention in which the staged pumps are driven by a vapor turbine which itself is being driven by the heated fluid.

FIG. 10 shows a further modification of the present system. Schematically, heated fluid enters primary pump 71 and passes through heating coils 73 in the preheater section at a lower than final exit pressure. The temperature of the fluid increases until evaporator 1 is reached, at which time thermo-dynamic transition occurs and the fluid partially vaporizes. Instead of simply increasing the pressure of the heated fluid and causing the fluid to immediately enter the second evaporator, the fluid is separated into its liquid and vapor states in order to avoid cavitation. As stated previously, this is particularly advantageous with the state of the art pump technology when the fluid has been converted into a vapor state such that the fluid contains between approximately 10 and 85% vapor. Thus, the liquid phase is fed into stage pump 76 while the vapor phase is pumped through stage pump 75. Both phases are then mixed in mixer 78 and fed into the second evaporator section. The pressure within the second evaporator can be controlled by means of throttle valve 79 or 80 in order to gain further flexibility within the system. Upon exit from the second evaporation, the fluid, now entirely in a vapor state, is superheated in the final section of the exchanger. At this point, the majority of the superheated vapor is drawn off at Y although a small quantity of such vapor can be bled by means of throttle valve 80 and fed into turbine 77 which can drive stage pumps 75, 76. In this way, much of the pumping work can be performed within the system. Once the heat of the vapor is converted within turbine 77, the vapor is mixed with the incoming liquid 72 in a preregenerator 70. This has the further advantage of perheating the entering fluid 72. Recirculation is again optional within each evaporator.

The following example, for the purpose of illustrating a typical staged heat exchanger design the results of which have been used to generate FIGS. 11–15, will help to describe the advantages and trade offs of the present invention and the criteria for selecting the variables discussed previously.

EXAMPLE

A waste heat boiler was employed werein hot gases consisting mostly of air and petroleum combustion products, for instance, from the exhaust of a gas turbine, at one atmosphere pressure were employed to heat water from an arbitrary starting temperature of 59° F. to a fixed superheated steam at high pressure. For the purposes of these calculations, the heating gases were assumed to have a flow rate of 100 lb/sec. and a specific heat at constant pressure of 0.25 Btu/° F/lb. on the average during the entire heat exchanging process. Water, being the fluid to be heated, is assumed to have a specific heat of 1 Btu/lb/° F. It was assumed that the average heat transfer coefficient within a typical boiler was 20 Btu/° F/hr/ft$^2$ which is a realistic value governed by the gaseous thermal condutive coefficients of the air-petroleum combustion product of the gas mixture. The water at 59° F. entered the heat exchanger precompressed to a certain pressure below the final exit pressure. After the water was boiled to a quality $Z_1$, the mixture of vapor and liquid was compressed again to a final pressure to reach a new quality $Z_2$. The ratio of the final pressure to the precompressed pressure, R, together with the first thermodynamic transition temperature, specific heat ratio $\lambda$ and $Z_1$ are design variables. The steam's final temperature was chosen as a design point as the temperature is important for steam turbine operation and various chemical processes. The amount of steam that can be generated is calculated as a function of the "neck" temperature $T_N$. The steam flow rate $M_2$ is then a direct measure of the amount of heated fluid and the amount of heat being recovered. For the purposes of determining the thermodynamic properties of steam, an ordinary steam table available in most chemical engineering handbooks was employed. The method outlined below is used to illustrate the design and operating parameter differences between a conventional (single evaporator section) heat exchanger and a pressure-stage multievaporator heat exchanger which constitutes this invention. As with most calculations involving fluid-phase transitions, the calculations proceed on a sectional basis starting with the superheater section proceeding to the evaporator sections and ending with the preheater section. Once the calculations have been completed for all sections, individually, the results are merely added in order to get an overall energy balance within the system.

The following equations illustrate how the final figures are derived with symbolic notations taken from FIG. 3.

A. The superheater section:

Engergy balance $$M_1 Cp_1[T_{21} - (T_{C-E} + \Delta T'_N)] = M_2[hg(T_{23}) - hw(T_{C-E})]$$

$hw(T_{C-E})$ = enthalpy of water at temperature $T_{C-E}$
$hg(T_{23})$ = enthalpy of superheated steam at temperature $T_{23}$.

Through the use of this equation, the steam flow rate $M_2$ of the heated fluid can be obtained. The enthalpy of steam at the saturation point E can be determined from steam tables, as can $hw(T_{C-E})$ and $hg(T_{23})$.

We can now proceed to determine the temperature of the heating fluid at $E°(T_{E'})$:

$$Q_s = M_1 Cp_1(T_{21} - T_{E'}) = M_2[hg(T_{23}) - hg(T_{EC})]$$

Once this is completed, the log-mean-temperature difference in the superheater section can be determined:

$$\Delta Tm = \frac{(T_{21} - T_{23}) - (T_{E'} - T_{C-E})}{\log_e\left[\frac{(T_{21} - T_{23})}{(T_{E'} - T_{C-E})}\right]}$$

The surface area can then be calculated:

$$A_s = Q_s/U\Delta Tms$$

Identical calculations can be made in the evaporator and preheater sections. The heat transfer rates $Q_s$, $Q_E$ and $Q_p$ are merely added and an overall area A can be calculated by adding the individual areas of each section $A_s$, $A_E$ and $A_p$.

Once the calculations are completed for the conventional heat exchanger as shown above, similar calculations can be made for the pressure staged heat exchanger of the present invention. However, two additional variables must be selected, namely, the quality or fraction of liquid converted to vapor in the first evaporator $Z_1$, and the pressure ratio R which is the heated fluid pressure before and after the stage pump.

The superheater section is not affected by using the pressure staged system of the present invention. The other parts of the system must be calculated individually using standard energy balance and heat transfer equations together with provision for the additional enthalpy input from the stage pump.

One can begin by assuming various values for R and $Z_1$. The staged pump pressurized the water to $P_B = P_{c/R}$ wherein $P_B$ and $P_c$ are the pressures at points B and C respectively in FIG. 3. From the steam table, one can determine $T_{A-B}$ according to $P_B$ and all of the enthalpy values for liquid and vapor at $P_B$ and $T_{A-B}$. Once $Z_1$ is chosen, the pump work consumed in compressing the vapor adiabatically is calculated. In the following calculations, the compressor efficiency is assumed to be 0.75. Thus, the pump work per pound of vapor is:

$$W = C_p X(T_{A-B} + 460° R) X\left[R^{\frac{\lambda-1}{\lambda}} - 1\right] \div \eta_c$$

wherein $\eta_c$ = pump efficiency and $\lambda$ can be determined from standard steam tables. Once the pump work is calculated, the total pump power can be determined:

$$P = M_2 W Z_1$$

From an energy balance at pressure $P_c$, one can obtain the quality of $Z_2$, that is, the fraction of liquid that has been converted to vapor after staging:

$$[Z_2 hfg(T_{C-E}) + (1-Z_2)hf(T_{C-E})] = Z_1 hfg(T_{A-B}) + (1-Z_1)hf(T_{A-B}) + Z_1 W$$

wherein
$hf$ = enthalpy of the liquid
$hfg$ = latent heat of evaporation

The energy balance and heat transfer equations can be applied again to all of the other sections in turn $$hc = (1-Z_2)hf_e + Z_2 hfg_e$$

wherein
$h_c$ = the enthalpy at point C in FIG. 3
$hf_e$ = the enthalpy of the liquid at $T_{C-E}$
$hfg_e$ = latent heat of evaporation at $T_{C-E}$ One can then calculate the heat transfer rate $Q_{e2}$ in the second evaporator:

$$Q_{e2} = M_1 Cp_1(T_{E'} - T_{C'}) = M_2[h_c(T_{C-E}) - h_c(T_{C-E})]$$

and $T_{C'}$ as follows:

$$Q_{e2} = UA_{e2}\Delta Tm_{e2}$$

$$\Delta Tm_{e2} = \frac{(T_{E'} - T_{C-E}) - (T_{C'} - T_{C-E})}{\log_e\left[\frac{(T_{E'} - T_{C-E})}{(T_{C'} - T_{C-E})}\right]}$$

$A_{e2}$ = surface area of evaporator 2

The first evaporator calculation can then proceed as follows:

$$Q_{e1} = M_1 Cp_1(T_{C'} - T_{A'})$$
$$Q_{e1} = M_2[Z_1 hfg(T_{C-E}) + (1-Z_1)hf(T_{C-E})]$$

The later equation results in achieving the temperature $T_{A'}$ and ultimately allows one to arrive at the surface area of evaporator 1, $A_{e1}$:

$$Q_{e1} = UAe_1 \Delta Tm$$

$$\Delta Tm_{e1} = \frac{(T_{C'} - T_{A-B}) - (T_{A'} - T_{A-B})}{\log_e\left[\frac{(T_{C'} - T_{A-B})}{(T_{A'} - T_{A-B})}\right]}$$

The preheater section calculations are similar to those carried out above:

$$Q_p = M_1 Cp_1(T_{A'} - T_{22}) = M_2[hfg(T_{A-B}) - hf(T_{24})]$$

$$Q_p = UA_p \Delta Tm_p$$

$$\Delta Tm_p = \frac{(T_{A'} - T_{A-B}) - T_{22} - T_{24})}{\log_e\left[\frac{(T_{A'} - T_{A-B})}{(T_{22} - T_{24})}\right]}$$

Using the analytical method outlined above, FIG. 11 was generated as follows:

Hot gas having a flow rate $M_1$ was fed into the heat exchanger at 100 lb/sec. The hot gas temperature was 950° F. and was assumed to have $C_p$ of 0.25 Btu/lb/° F. These parameters generally correspond to the operating conditions of a combined cycle gas turbine-steam turbine power plant. The required steam was assumed to be 900° F. at a pressure of 400 psia. Two "neck" temperatures, $\Delta T_N$, were chosen at 50° F. and $-20°$ F. for comparison purposes. The water to be heated entered the exchanger at approximately 59° F.

Following the above-outlined equations, a 50° F. "neck" showed that a heat exchanger was required to have a surface area of 18,443 sq. ft. and would generate steam at a rate of 10.88 lb/sec. The average heat flux Q/A was found to be $3.04 \times 10^3$ Btu/sq.ft/hr. By using pressure ratios, R, of 2, 4 and 8 and varying the values of $Z_1$ from 0 to 1, one can calculate the increase in heat flux, Q/A, or the corresponding reduction in required surface area. These results are shown in FIG. 11. The advantages of using the present system can be appreciated by viewing FIG. 11 and can be summarized as follows:

1. The use of the staged evaporative heat transfer system of the present invention results in a significant reduction in heat transfer surface area because the constraint of the apparent "neck" temperature is removed.
2. High values of $Z_1$ and high compression ratios R give maximum heat flux values; that is, greater reductions in heat transfer area or weight with a larger amount of pump work.
3. The steam rate can be increased from 10.88 lb/sec. to 12.56 lb/sec. using an (apparent) negative "neck" temperature of $-20°$ F., which would increase energy recovery by 15%. Without practicing the present invention, this would be impossible.
4. At higher values of R, there are regions of $Z_1$ wherein even the heat exchanger of the present invention cannot operate because of a persistent negative "neck" or at times, the mixture cannot reach the boiling temperature at final pressure. This region is labeled "forbidden zone" on FIG. 11.
5. In the case of an apparent negative "neck" of $-20°$ F., there is no way a heat exchanger can be built without using the staging pump of this invention.
6. This invention requires hardware not found in conventional heat exchangers, such as a small steam turbine, two pumps, liquid vapor separators and mixers. But the lower pressure preheater and evaporator sections can have thinner than conventional walls as permitted by the ASME Boiler Code.

Figure 11:
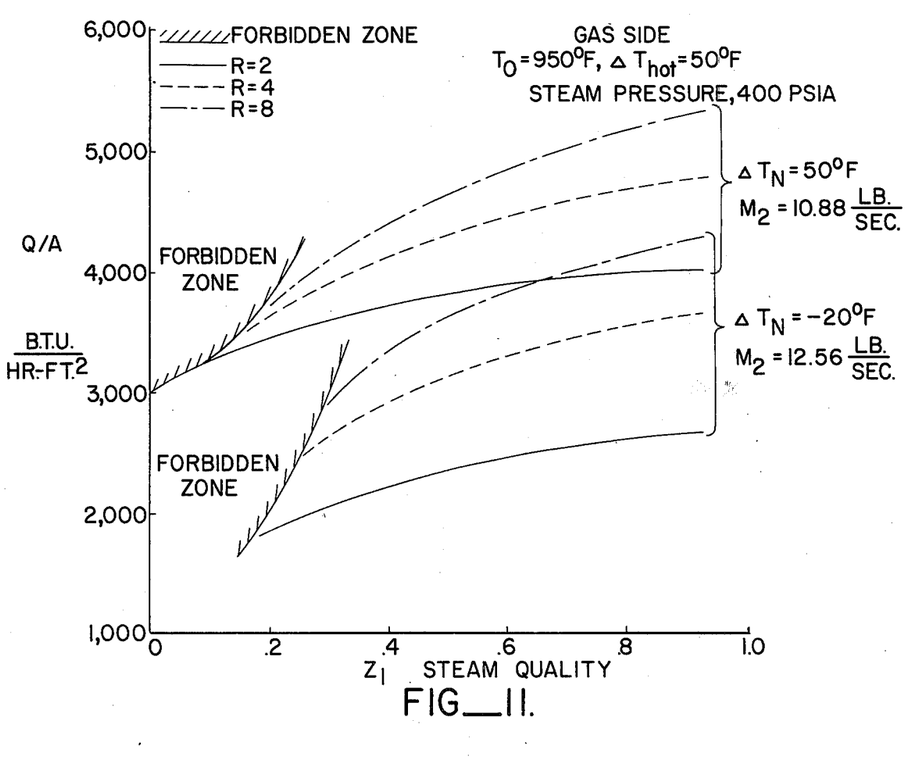
FIGS. 11–13 represent graphs of numerical calculations described in this application which numerically point out the advantages in surface area savings and the ability of operating in a "negative pinch" condition by practicing the present invention.

Referring to FIG. 11, one can see that using a "neck" of 50° F. with an $M_2$ of 10.88 lb/sec., a conventional heat exchanger having a $Z_1$ equal to 0 would have a Q/A of approximately 3,000 Btu/hr/ft². By using the heat exchanger of the present invention in which $Z_1$ could be selected, for example, to be 0.95, Q/A would be in the vicinity of 4,000 Btu/hr/ft². Thus, by use of a staged pressure heat exchanger, the heat transfer area can be reduced by 25% as compared to a conventional heat exchanger while yielding the same energy transfer.

Figure 12:
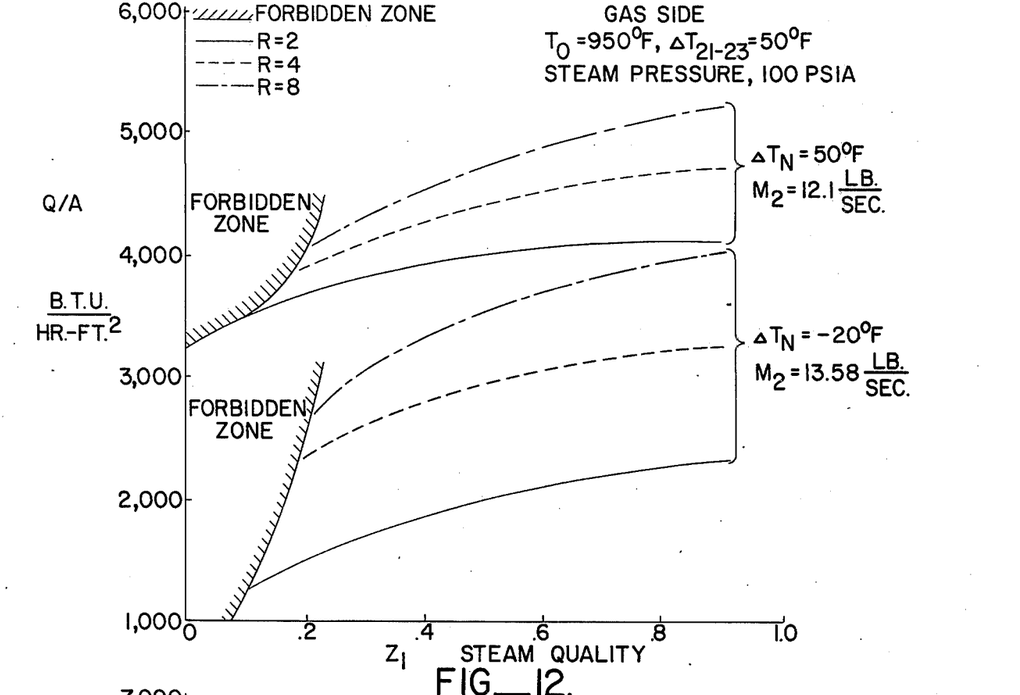

FIG. 12 was generated in a similar manner except that the steam pressure was dropped to 100 psia. This condition corresponds to the typical operation of a heating plant. One can see by comparing FIG. 12 to FIG. 11 that the graphs are quite similar except that the "forbidden zone" of FIG. 12 is somewhat narrower. Also, the effects of the compression ratios are not as large for a large "neck" as it is when the "neck" is small or negative.

Figure 13:
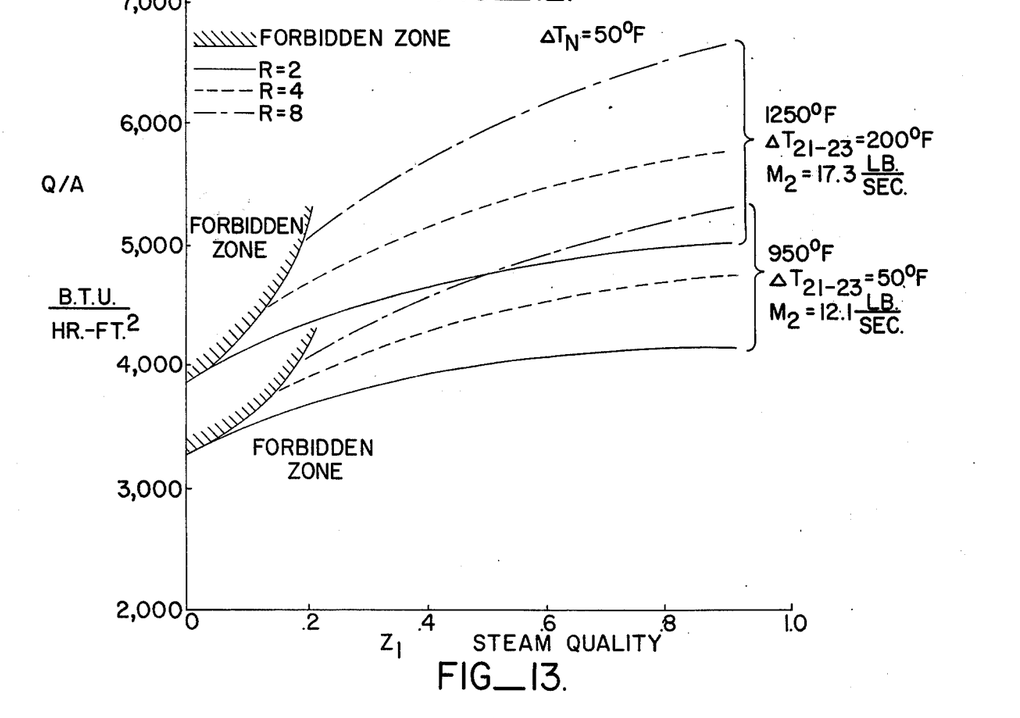

FIG. 13 was generated in which the hot gases entered the evaporator at 1,250° F. and required a steam temperature assumed to be 1,000° F. If the "neck" was assumed to be 50° F., the plot as shown in FIG. 13 is generated. For comparison sake, the upper curve from FIG. 12 has been superimposed on the graph in FIG. 13 so that one could compare the two. The potential reduction of surface area or increased heat flux is very pronounced with a heating gas of 1,250° F. at higher $Z_1$ and larger R values. As can be seen, a potential reduction of 40% of the surface area is possible as compared to conventional heat exchangers.

The advantages of the staged counterflow heat exchanger of the present invention are four-fold. Firstly, the use of the present invention results in cost reductions by reducing the surface area and weight of the heat exchanger. Secondly, one can achieve the highest possible temperature in the heat receiving fluid so that the equipment associated with the system can be designed more efficiently. Thirdly, energy losses are reduced which, in turn, saves operating costs. Fourthly, the weight can be further reduced by using thinner walls in the preheater and low temperature evaporator sections within the bounds of the ASME Boiler Code. In order to dramatize the actual savings, a "Figure of Merit" $\eta$ has been devised. This Figure of Merit can best be appreciated by citing actual estimated cost savings figure realized in practicing the present invention with the trade-off of additional equipment and operating costs. Generally, boilers surface area cost in the range of $5.00 to $10.00/ft². The pump, compressor and accessories are estimated to cost between $10.00 and $30.00/hp depending on the value of $Z_1$. The Figure of Merit $\eta$ can be defined as the surface area $A\cdot$ without staging minus the surface area A with staging times $C_1$, the cost/ft² of the heat exchanger as savings, minus the pump costs $M_2W$ expressed in horsepower times the cost per horse power, $C_2$, as an additional expense. The difference is divided by the surface area times cost $C_1$ without staging and expressed as a percentage.

$$\eta = \frac{(A\cdot - A)C_1 - M_2WC_2}{A\cdot C_1}$$

Thus, $\eta$ is really a fraction which is achieved by subtracting the pump cost from the cost difference between a heat exchanger without and with staging divided by the cost of a heat exchanger without staging. Thus, the greater this fraction, the greater are the economies of practicing the present invention.

Figure 14:
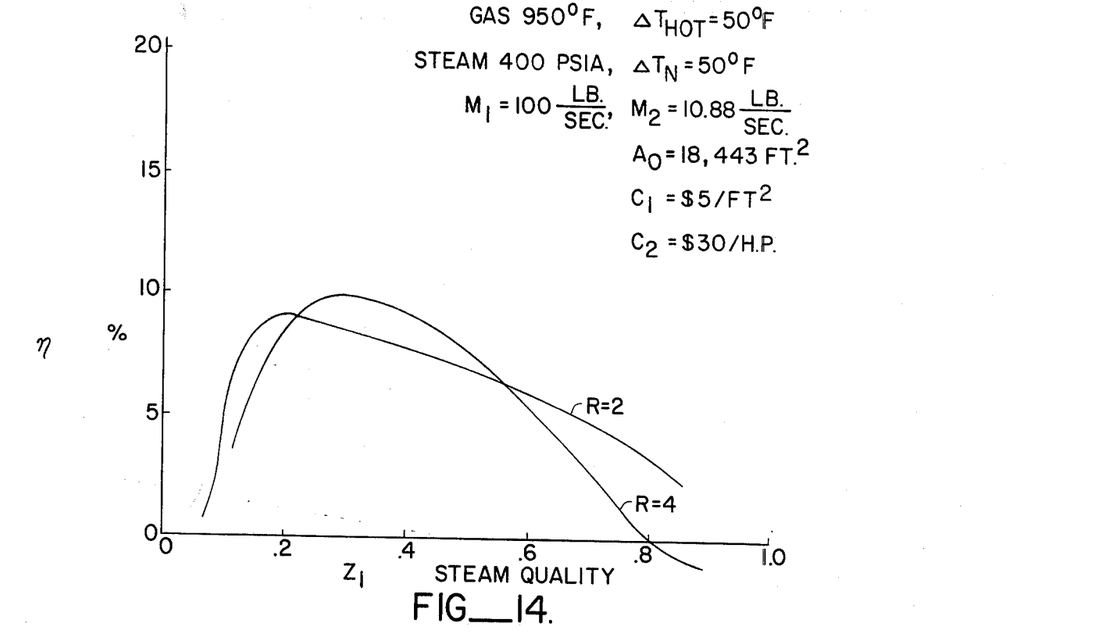
FIGS. 14–15 are further graphical representations of numerical calculations showing the advantage in design parameters which results in equipment cost savings by practicing the present invention.

In order to present the fairest comparison, figures were chose as examples which would least point out the advantages of practicing the present invention. For example, $C_1$ was chosen at $5.00/sq.ft and $C_2$ at $30.00/hp. The Figure of Merit in terms of capital cost for compression ratios R of 2 and 4 are shown in FIG. 14. The greatest advantage occurs when $Z_1$ is between 0.2 and 0.4.

Figure 15:
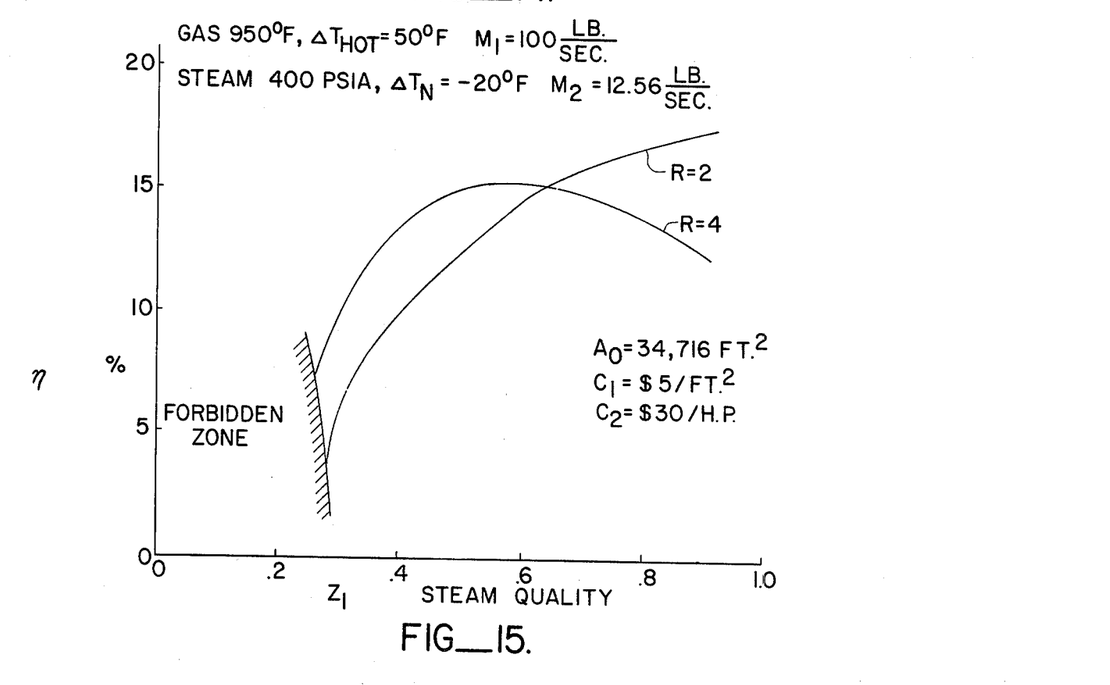

In order to optimize a heat exchanger according to the present invention for maximum heat recovery, operation in the "negative pinch" neck temperature region is preferred. Although a mathematical comparison between the heat exchanger of the present invention and one of conventional design can be made, in actuality a conventional heat exchanger cannot operate in a "negative pinch" area. If a "negative neck" temperature of −20° F. is chosen, Figures of Merit for pressure ratios of 2 and 4 are shown in FIG. 15. For a compression ratio of 4, the synthesized "Figure of Mert" has a peak at $Z_1$ between 0.5 and 0.7. At a compression ratio of 2, the Figure of Merit increases with $Z_1$. Thus, design parameter selection indicates that complete evaporation should be employed at low compression ratios. As an additional advantage not included in the above-recited calculations, is the fact that at the lower pressures encountered in the preheater and evaporator sections of the present invention, the wall thicknesses can be reduced (up to the limits recited in the ASME Boiler Code) resulting in further cost savings.

What is claimed is:

1. A pressure staged heat exchanger for improving the transfer of energy from a first to a second fluid traveling in countercurrent paths comprising:
    A. means for preheating the second fluid from its temperature at its entrance to the heat exchanger to a temperature wherein said second fluid enters thermodynamic transition at a pressure substantially below the exit pressure of said second fluid from the heat exchanger,
    B. low pressure evaporator means to cause the second fluid to reach a state of partial thermodynamic transition, $Z_1$,
    C. means to increase the pressure of the second fluid to a point which substantially equals the final exit pressure of said second fluid, and
    D. high pressure evaporator means to cause the second fluid to enter a second thermodynamic transition.

2. The pressure staged heat exchanger of claim 1 wherein means for superheating said second fluid are located after said high pressure evaporator.

3. The pressure staged heat exchanger of claim 1 wherein when the second fluid exiting said low pressure evaporator possesses a conversion of liquid to vapor between the range of approximately 10 to 85%, providing means of separating the liquid and vapor phases of said second fluid, followed by means for increasing the pressure of said liquid and vapor phases separately, followed by means for mixing said liquid and vapor phases before entering said high pressure evaporator means.

4. The pressure staged heat exchanger of claim 1 wherein a portion of the second fluid which exits said heat exchanger is bled to the input of a turbine which is functionally connected to means for increasing the pressure of said second fluid between said low and high pressure evaporator means.

5. The pressure staged heat exchanger of claim 4 wherein the second fluid entering said turbine is in a substantially vaporous state while that portion of said second fluid exiting said turbine is in a substantially liquid state.

6. The pressure staged heat exchanger of claim 5 wherein that portion of said second fluid exiting said turbine is caused to mix with the second fluid entering the heat exchanger.

7. The pressure staged heat exchanger of claim 1 wherein circulating means are functionally connected to each evaporator section.

8. A pressure staged heat exchanger for improving the transfer of energy from a first to a second fluid traveling in countercurrent paths comprising:
    A. means for preheating the second fluid from its temperature at its entrance to the heat exchanger to a temperature wherein said second fluid enters a thermodynamic transition point at a pressure substantially below the exit pressure of said second fluid from the heat exchanger,
    B. low pressure evaporator means to cause the second fluid to reach a state of partial thermodynamic transition, $Z_1$,
    C. means to increase the pressure of the second fluid to a point in which thermodynamic transition ceases,
    D. means to increase the temperature to a point wherein theremodynamic transition reoccurs,
    E. a second evaporator means for containing said second fluid during said second thermodynamic transition,
    F. additional pressure increasing means and evaporator means for repeating thermodynamic transition of the second fluid until a final exit designed pressure is achieved, and
    G. superheater means to bring said second fluid to its final exit temperature.

9. The pressure staged heat exchanger of claim 8 wherein when the second fluid exiting each of the evaporator means but the final evaporator means, possesses a conversion of liquid to vapor between the range of approximately 10 to 85%, providing means of separating the liquid and vapor phases of said second fluid, followed by means for increasing the pressures of said liquid and vapor phases separately followed by mixing said liquid and vapor phases before entering subsequent evaporator sections.

10. The pressure staged heat exchanger of claim 8 wherein said means to increase the pressure of said second fluid are compressor means.

11. The pressure staged heat exchanger of claim 8 wherein said means by increasing the pressure of said liquid and vapor phases are liquid and vapor pumps, respectively.

12. The pressure staged heat exchanger of claim 10 wherein said vapor and liquid pumps are selected to maintain an approximate constant Z.

13. A method of improving the transfer of energy in a countercurrent heat exchanger from a first fluid to a second fluid, wherein said first fluid is at a higher temperature than said second fluid, said method comprising:
    A. preheating the second fluid to a thermodynamic transition point at a pressure substantially below the exit pressure of said second fluid from the heat exchanger,
    B. causing the second fluid to enter a low pressure evaporator wherein said second fluid enters a state of partial thermodynamic transition,
    C. increasing the pressure of the second fluid to a point which substantially equals the final exit pressure of said second fluid, and
    D. causing the second fluid to enter a high pressure evaporator wherein said second fluid continues thermodynamic transition.

14. The method of claim 13 wherein said second fluid is superheated after leaving said second evaporator.

15. The method of claim 13 wherein when the second fluid exiting said low pressure evaporator possesses a conversion of liquid to vapor between the range of approximately 10 to 85%, the liquid and vapor phases are separated before being pressurized to the final exit pressure.

16. The method of claim 15 wherein the liquid and vapor phases are mixed before entrance into the high pressure evaporator.

* * * * *

UNITED STATES PATENT AND TRADEMARK OFFICE
CERTIFICATE OF CORRECTION

PATENT NO. : 4,072,182
DATED : February 7, 1978
INVENTOR(S) : Dah Yu Cheng

It is certified that error appears in the above-identified patent and that said Letters Patent are hereby corrected as shown below:

In column 5, last line, "liquid" 60 should read -- gas -- 60 and "gas" 61 should read -- liquid -- 61.

In column 10, in the formula appearing in lines 60-65, that portion reading "$-T_{22}-T_{24})$" should read -- $-(T_{22}-T_{24})$ --.

In claim 12, line 1, "10" should read --11--.

Signed and Sealed this

Twenty-seventh Day of June 1978

[SEAL]

Attest:

RUTH C. MASON
Attesting Officer

DONALD W. BANNER
Commissioner of Patents and Trademarks